United States Patent
Tan et al.

(10) Patent No.: US 9,342,158 B2
(45) Date of Patent: May 17, 2016

(54) SUB-FRAME ACCUMULATION METHOD AND APPARATUS FOR KEEPING REPORTING ERRORS OF AN OPTICAL NAVIGATION SENSOR CONSISTENT ACROSS ALL FRAME RATES

(71) Applicant: PixArt Imaging (Penang) SDN. BHD., Penang (MY)

(72) Inventors: Zi Hao Tan, Penang (MY); Joon Chok Lee, Penang (MY)

(73) Assignee: PixArt Imaging (Penang) SDN. BHD., Phase III Bayan Lepas Free Industrial Zone, Penang (MY)

( * ) Notice: Subject to any disclaimer, the term of this patent is extended or adjusted under 35 U.S.C. 154(b) by 151 days.

(21) Appl. No.: 14/258,030

(22) Filed: Apr. 22, 2014

(65) Prior Publication Data

US 2015/0301618 A1 Oct. 22, 2015

(51) Int. Cl.
| | |
|---|---|
| *G06F 3/03* | (2006.01) |
| *G06F 3/01* | (2006.01) |
| *G06F 3/0354* | (2013.01) |
| *G06T 11/40* | (2006.01) |
| *H04N 19/00* | (2014.01) |
| *H04N 19/132* | (2014.01) |

(52) U.S. Cl.
CPC .............. *G06F 3/0304* (2013.01); *G06F 3/017* (2013.01); *G06F 3/03543* (2013.01); *G06T 11/40* (2013.01); *H04N 19/00* (2013.01); *H04N 19/132* (2014.11); *G06F 2203/0333* (2013.01)

(58) Field of Classification Search
CPC ... G06F 3/0304; G06F 3/017; G06F 3/03543; G06F 2203/0333; G06F 3/033; G06F 3/0317; G06T 11/40; H04N 19/00; H04N 19/132
See application file for complete search history.

(56) References Cited

U.S. PATENT DOCUMENTS

| | | | | |
|---|---|---|---|---|
| 7,161,586 | B2 * | 1/2007 | Lauffenburger | G06F 3/0317 345/166 |
| 7,728,816 | B2 * | 6/2010 | Xu | G06F 3/0317 345/156 |
| 2005/0001817 | A1 * | 1/2005 | Lauffenburger | G06F 3/0317 345/166 |
| 2005/0068300 | A1 * | 3/2005 | Wang | G06F 3/0317 345/166 |
| 2005/0190158 | A1 * | 9/2005 | Casebolt | G06F 3/0383 345/166 |
| 2006/0132443 | A1 | 6/2006 | Chien Wu | |
| 2008/0174787 | A1 * | 7/2008 | Teo | G06F 3/0317 356/614 |
| 2009/0109440 | A1 * | 4/2009 | Wu | G06F 3/0383 356/445 |

FOREIGN PATENT DOCUMENTS

| | | |
|---|---|---|
| TW | 200412529 | 7/2004 |
| TW | 200919273 | 5/2009 |
| TW | 200943131 | 10/2009 |

\* cited by examiner

*Primary Examiner* — Larry Sternbane
*Assistant Examiner* — Ivelisse Martinez Quiles
(74) *Attorney, Agent, or Firm* — Winston Hsu; Scott Margo

(57) ABSTRACT

A method for making a lower frame rate of an optical navigation sensor mimic a higher frame rate of the optical navigation sensor includes: receiving a motion delta of the optical navigation sensor at the lower frame rate; dividing the motion delta into a smaller number of parts; dividing a time period of the lower frame rate to generate a time threshold which is shorter than the time period of the lower frame rate; receiving a clock signal for updating a counter; and outputting a first part of the delta when the counter reaches the time threshold.

10 Claims, 4 Drawing Sheets

SUB-FRAME ACCUMULATION METHOD AND APPARATUS FOR KEEPING REPORTING ERRORS OF AN OPTICAL NAVIGATION SENSOR CONSISTENT ACROSS ALL FRAME RATES

BACKGROUND OF THE INVENTION

1. Field of the Invention

The present invention relates to reporting errors for an optical navigation sensor for use in a computer mouse, and more particularly, to a method for keeping reporting errors constant over different frame rates.

2. Description of the Prior Art

When a computer mouse is moved by a user on a 2-D surface, information of the 2-D surface is captured at various intervals by an optical navigation sensor, in order to obtain a delta (change in position), and then sent to an accumulator, which is also within the optical navigation sensor. The rate at which information is captured and sent to the accumulator is known as the frame rate of the optical navigation sensor. The accumulator in the optical navigation sensor will be accessed through SPI (Serial Peripheral Interface) at certain intervals by a host (for example, an MCU), and subsequently sent to a computer, so that the computer can determine current position of the computer mouse and transform that information into a cursor position on a display screen of the computer. The rate at which the accumulator is accessed is known as the polling or reporting rate of the optical navigation sensor. Where there is a discrepancy between the determined and actual position of the computer mouse, a reporting error will result. Assuming a constant polling rate, reporting/polling errors at higher frame rates will be fewer than at lower frame rates, as the computer has more available information for making a determination.

Please refer to FIG. 1A and FIG. 1B, which illustrate different frame rates of an optical navigation sensor, and the reporting error for a constant polling rate. FIG. 1A illustrates a frame rate of 12 KHz or frame period of 83.33 µs, and FIG. 1B illustrates a frame rate of 4 KHz or frame period of 250 µs. The average polling rate in both diagrams is ~1 KHz or polling period of ~1 ms (reporting errors are shown for polling period of both 1.01 ms and for 0.99 ms). In FIG. 1A, when the polling period is 1.01 ms, the total number of frames collected is 12 or 13; when the polling period is 0.99 ms, the total number of frames collected is 11 or 12. The respective errors are $1/12$ (8.3%). In FIG. 1B, when the polling period is 1.01 ms, the total number of frames collected is 4 or 5; when the polling period is 0.99 ms, the total number of frames collected is 3 or 4. The respective errors are $1/4$ (25%). As illustrated by these diagrams, the higher the frame rate, the lower the reporting error.

When a user operates a computer mouse at different velocities (for example, when playing a computer game), the frame rate of the optical navigation sensor will vary with the velocity; in other words, the frame rates vary depending on the mouse usage. In other systems, frame rate of the optical navigation sensor will vary according to surface, where a darker surface will have a lower frame rate than a brighter surface. The user will therefore experience inconsistent reporting errors over the different frame rates, which will not only affect the tracking performance of the mouse, but will also detract from the user's enjoyment of the game.

It is therefore an objective of the present invention to provide a method which can achieve constant reporting errors over different frame rates of an optical navigation sensor.

SUMMARY OF THE INVENTION

A method for making a lower frame rate of an optical navigation sensor mimic a higher frame rate of the optical navigation sensor comprises: receiving a motion delta of the mouse at the lower frame rate; dividing the motion delta into a smaller number of parts; dividing a time period of the lower frame rate to generate a time threshold which is shorter than the time period of the lower frame rate; receiving a clock signal for updating a counter; and outputting a first part of the delta when the counter reaches the time threshold.

An apparatus for making a lower frame rate of an optical navigation sensor mimic a higher frame rate of the optical navigation sensor comprises: a post-interpolation circuit for outputting a motion delta of the mouse at the lower frame rate; a divider, coupled to the post-interpolation circuit, for receiving the motion delta and dividing the motion delta into a smaller number of parts; an accumulation update program counter, coupled to the divider, for receiving a clock signal for updating the counter and outputting a first part of the delta when the counter reaches a time threshold which is shorter than the time period of the lower frame rate; and an accumulator, for receiving the divided delta.

These and other objectives of the present invention will no doubt become obvious to those of ordinary skill in the art after reading the following detailed description of the preferred embodiment that is illustrated in the various figures and drawings.

DETAILED DESCRIPTION

As described in the background section, an optical navigation sensor collects information related to the motion delta of the computer mouse and sends the information to an accumulator, wherein the amount of data accumulated over a particular time period is according to a frame rate of the optical navigation sensor. The motion delta usually consists of changes in the mouse position in both the x and y directions, and can therefore be represented by delta_x and delta_y. At various intervals, known as the polling rate of the optical navigation sensor, all delta_x and delta_y information in the accumulator will be read by the host through SPI.

Figure 1A:
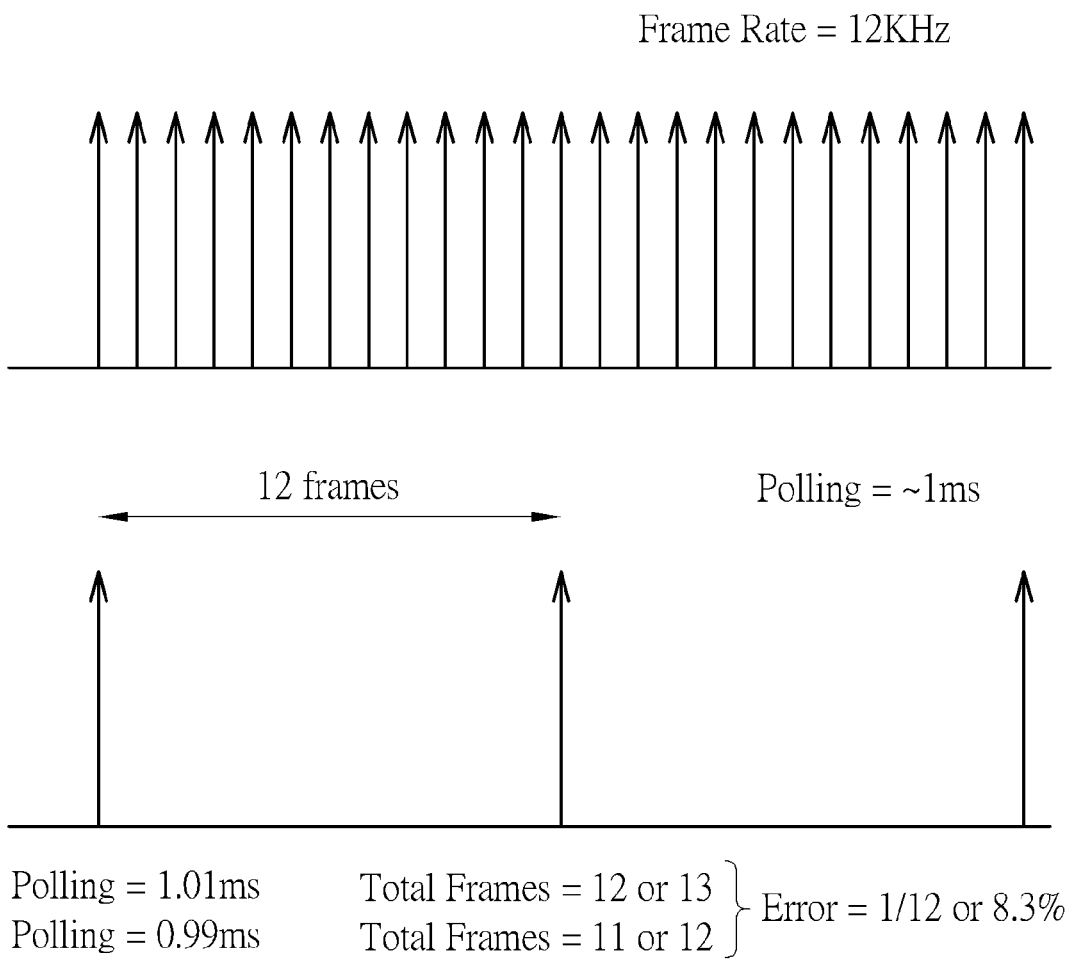
FIG. 1A is a diagram illustrating reporting errors for an optical navigation sensor having a frame rate of 12 kHz.
Figure 1B:
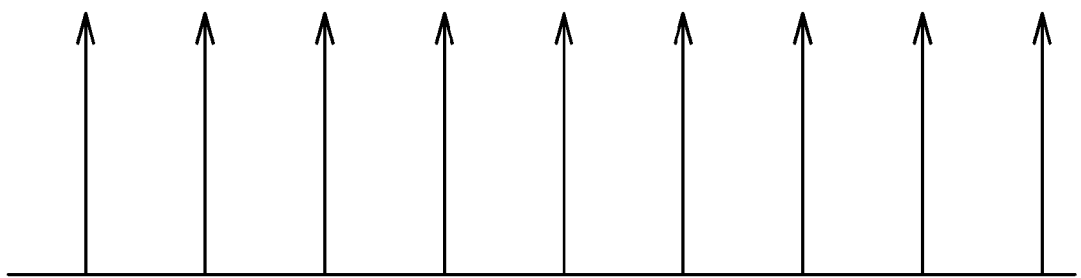
FIG. 1B is a diagram illustrating reporting errors for an optical navigation sensor having a frame rate of 4 kHz and the same polling rate as the optical navigation sensor illustrated in FIG. 1A.
Figure 1B:
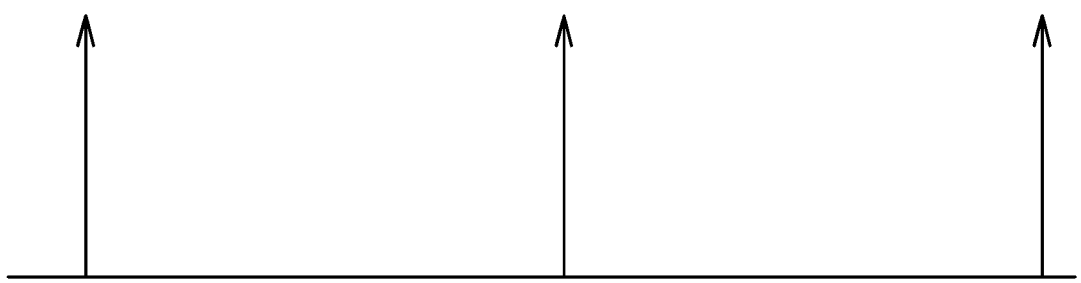

Assuming a constant polling rate, the sensor having a higher frame rate will update the accumulator more frequently than a sensor having a lower frame rate. For example, a sensor having a 12 kHz frame rate will update an accumulator three times more frequently than a sensor having a 4 KHz frame rate. If both sensors travel a distance of one inch at a constant speed of 1 inch/sec, and assuming both sensors have a 12,000 pci, there will be 12,000 counts reported over this distance. The 12 kHz sensor will detect a delta of 1 count each frame and update this delta to the accumulator, whereas the 4 KHz sensor will detect a delta of 3 counts each frame and update this delta to the accumulator. Assuming a polling rate of 1 ms, the host will read 12 counts from the accumulator for both sensors; however, these 12 counts correspond to motion data from 12 frames for the 12 kHz sensor, but only correspond to motion data from 4 frames for the 4 kHz sensor. As the host polling rate is not synchronized with the sensor frame rate, there will be certain inconsistencies in the read motion data, leading to reporting errors. This motion data variation will be three times larger for the sensor with 4 kHz frame rate as compared to the sensor with 12 kHz frame rate, as illustrated in FIG. 1A and FIG. 1B.

The present invention therefore provides a method and apparatus which can mimic the higher frame rate even when the optical navigation sensor is operating at a lower frame rate. The reporting errors will thereby remain constant over different frame rates.

Figure 2:
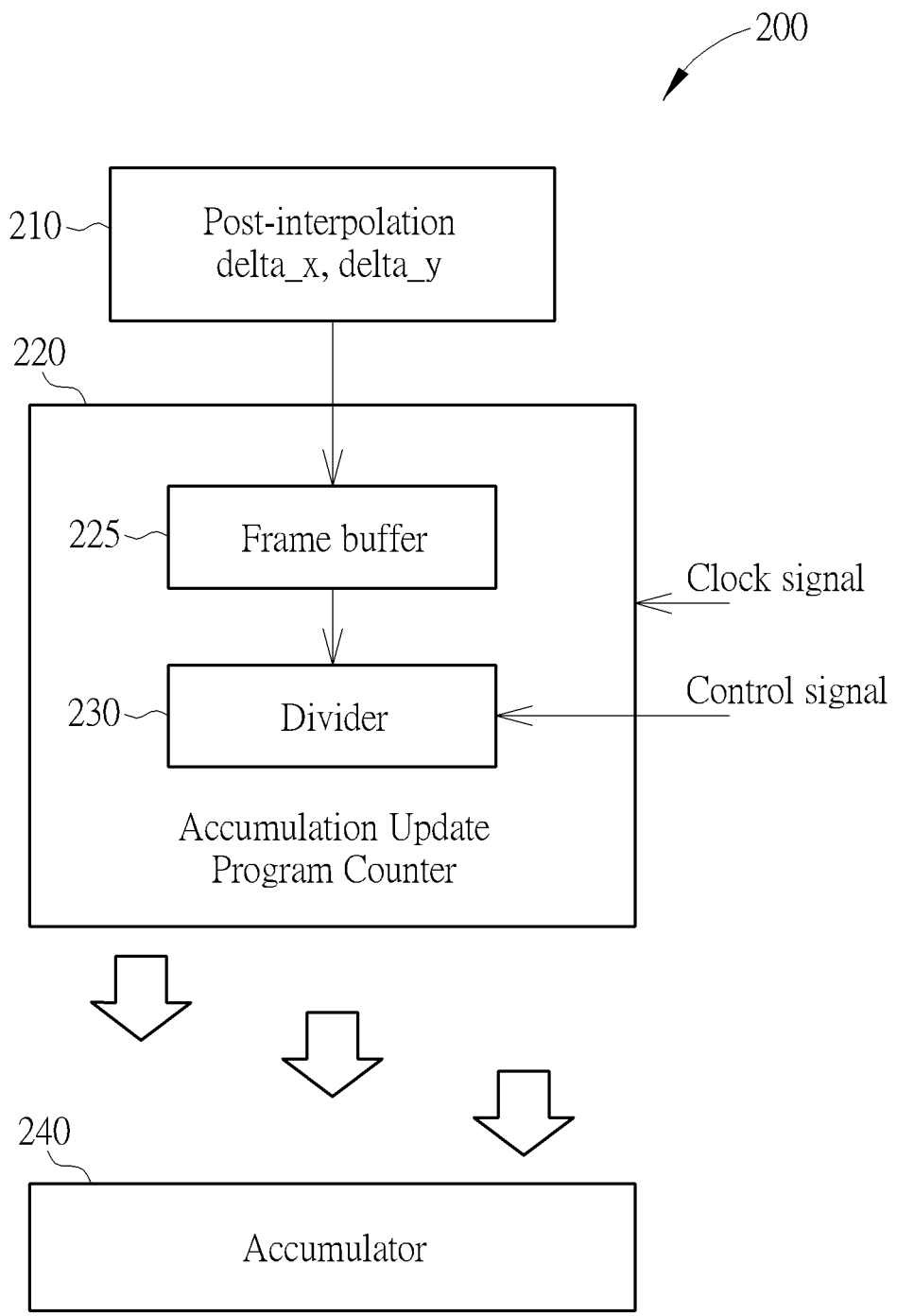
FIG. 2 is a diagram of an optical navigation sensor according to an exemplary embodiment of the present invention.
Figure 3:
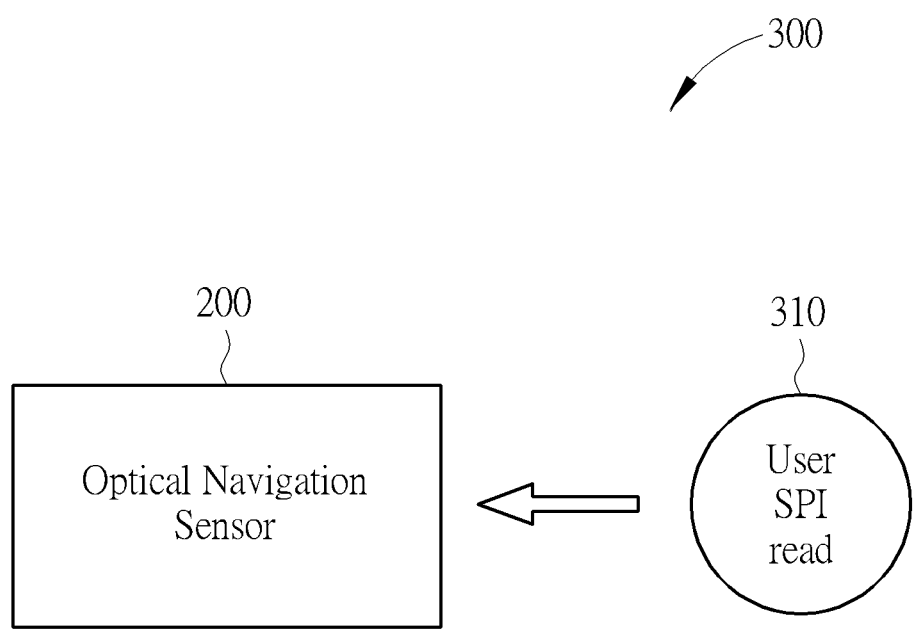
FIG. 3 is a diagram of an SPI read of the optical navigation sensor illustrated in FIG. 2.

Please refer to FIG. 2, which illustrates a hardware solution of the above method. FIG. 2 is an illustration of an optical navigation sensor 200. The optical navigation sensor 200 comprises a post-interpolation circuit 210, which collects delta_x and delta_y and sends the delta_x and delta_y to an accumulation update program counter 220. The accumulation update program counter contains a frame buffer 225, where the delta_x and delta_y are initially buffered, and a divider 230, which has a control signal input. After being buffered in the frame buffer 225, the delta_x and delta_y are input to the divider 230 and divided into a number of parts according to the control signal. A clock signal is input to the accumulation update program counter 220 for updating the counter. Upon the accumulation update program counter 220 reaching a certain value, a first part of the divided delta_x and delta_y will be sent to the accumulator 240, where they can be accessed by the host via an SPI read. This SPI read 310 is illustrated in FIG. 3, which is a diagram 300 of an SPI read 310 of the optical navigation sensor 200.

The aim of the present invention is to have the lower frame rate of the optical navigation sensor mimic the higher frame rate in order to keep reporting errors the same across all frame rates. Taking the frame rates illustrated in FIG. 1A and FIG. 1B as examples, the lower frame rate (4 kHz) is three times as slow as the higher frame rate (12 kHz).

The control signal therefore instructs the divider 230 to divide the delta_x and delta_y buffered in the frame buffer 225 into three parts. The rate at which these divided parts are sent to the accumulator 240 is also determined by dividing the original frame rate into three parts. In other words, when the clock signal has updated the accumulation update program counter 220 by 250 μs/3, i.e. after 83 μs, a first part of the divided delta will directly be output to the accumulator 240. The accumulation update program counter 220 is then reset and the control signal instructs the divider 230 to again output a part of the delta_x and delta_y when the clock signal has updated the accumulation update program counter 220 by another 83 μs, and so on, so that the divided delta is output to the accumulator 240 at a fixed sub-frame period. When a next frame of delta_x and delta_y is buffered by the frame buffer 225, the process will start again.

Please note that it is also possible for the delta to be broken into even smaller parts and sent out to the accumulator 240 at more frequent sub-frame rates, to further improve the reporting error. In this case, the control signal provided to the divider 230 will reflect the number of parts in which the delta is divided. The control signal may be generated according to the highest frame rate of the mouse 200 and the current frame rate, in order to keep a reporting error consistent across all frame rates of the mouse 200. The control signal will also affect the interval of divided delta_x and delta_y_output from the accumulation update program counter 220.

Please note that there will be a small time lag associated with the optical navigation sensor 200, which is due to the time required to first buffer the delta_x and delta_y and then divide them. This time lag will be insignificant, however; for the above example of a frame rate of 4 kHz, the maximum time lag will be 250 μs.

By breaking the delta into smaller parts according to a control signal, and then sending each divided delta part to the accumulator 240 at a fixed sub-frame period also determined by the control signal, the frame rate of the delta as perceived by the Host SPI read 250 mimics that of a higher frame rate. Reporting errors across all frame rates of the mouse 200 can therefore be kept consistent.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for making a lower frame rate of an optical navigation sensor mimic a higher frame rate of the optical navigation sensor, the method comprising:
   receiving a motion delta of the optical navigation sensor at the lower frame rate;
   dividing the motion delta into a smaller number of parts;
   dividing a time period of the lower frame rate to generate a time threshold which is shorter than the time period of the lower frame rate;
   receiving a clock signal for updating a counter; and
   outputting a first part of the motion delta to an accumulator when the counter reaches the time threshold.

2. The method of claim 1, further comprising:
   resetting the counter after the first part of the motion delta is outputted to the accumulator; and
   outputting each part of the motion delta to the accumulator each time the counter reaches the time threshold.

3. The method of claim 1, wherein the step of receiving a motion delta of the optical navigation sensor further comprises:
   buffering a frame of the received motion delta.

4. The method of claim 1, wherein the number of parts the motion delta is divided into is equivalent to a ratio of the higher frame rate to the lower frame rate.

5. The method of claim 4, wherein the time period is divided by the ratio to generate the time threshold.

6. An apparatus for making a lower frame rate of an optical navigation sensor mimic a higher frame rate of the optical navigation sensor, the apparatus comprising:
   a post-interpolation circuit for outputting a motion delta of the optical navigation sensor at the lower frame rate;
   a divider, coupled to the post-interpolation circuit, for receiving the motion delta and dividing the motion delta into a smaller number of parts according to a control signal;
   an accumulation update program counter, coupled to the divider, for receiving a clock signal for updating the counter and outputting a first part of the motion delta when the counter reaches a time threshold which is shorter than a time period of the lower frame rate; and
   an accumulator, for receiving the divided motion delta.

7. The apparatus of claim 6, further comprising:
   a frame buffer, coupled between the divider and the post-interpolation circuit, for buffering a frame of the received motion delta.

8. The apparatus of claim 6, wherein the counter is reset after the first part of the motion delta is outputted to the accumulator, and the accumulation update program counter outputs each part of the motion delta to the accumulator each time the counter reaches the time threshold.

9. The apparatus of claim 6, wherein the number of parts the motion delta is divided into is equivalent to a ratio of the higher frame rate to the lower frame rate.

10. The apparatus of claim 9, wherein the time period is divided by the ratio to generate the time threshold.

* * * * *